Aug. 2, 1938.                    H. HÜRLIMANN                    2,125,786
MOTOR VEHICLE WHEEL FOR TRACTORS
Filed Feb. 24, 1937
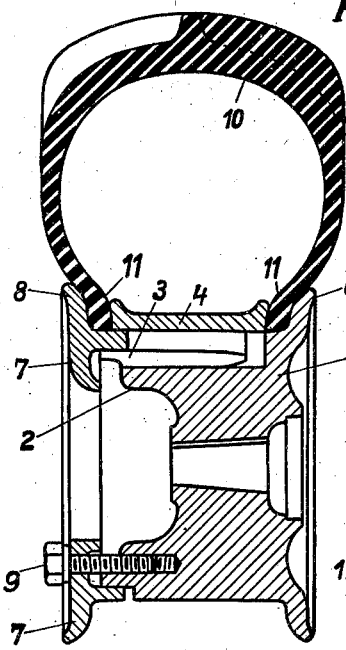
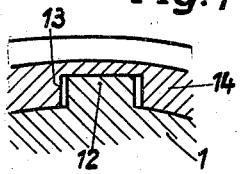
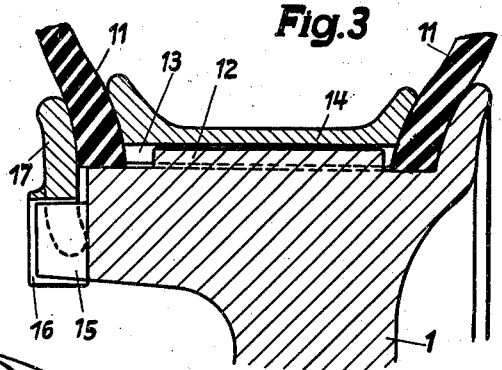
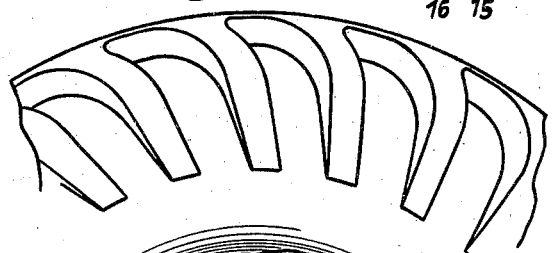
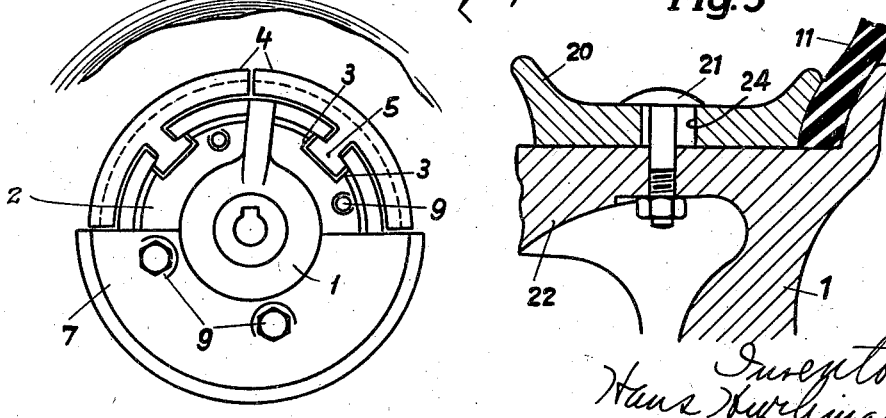

Patented Aug. 2, 1938

2,125,786

UNITED STATES PATENT OFFICE 2,125,786

MOTOR VEHICLE WHEEL FOR TRACTORS

Hans Hürlimann, Wil, Switzerland

Application February 24, 1937, Serial No. 127,501
In Switzerland August 25, 1936

3 Claims. (Cl. 152—401)

The present invention relates to motor vehicle wheels and more particularly to wheels of such motor vehicles which are used by farmers to run on soft ground, on meadows, for instance motor tractors, trucks.

Still more particularly the invention relates to wheels for small, low powered tractors adapted for use in hilly countries.

The main object of the invention is to provide a wheel of the type aforesaid which will not injure the grass covering the ground in any appreciable manner but which will never-the-less have a firm grip thereon.

I attain this object by making use of pneumatic tires having comparatively very great dimensions, especially broad tread face, but which run with a low internal air pressure, say about one atmosphere or even less. A suitable pneumatic tire has a breadth measured in radial direction of about twelve inches, but the over all diameter of the wheels of small tractors adapted for the use aforesaid should not exceed about three feet and two inches. Beside the tires very little space is left for the wheel body, the outside diameter of the wheel body has to be less than about 14 inches.

The present invention relates now to particular means to attach a tire of the size aforesaid on a wheel body of such small dimensions, in such a manner that no creeping of the tire can take place even at the maximum torque exerted on the wheels, when driving the tractor.

Other objects will be apparent from the following description and accompanying drawing.

The following description sets forth in detail certain means embodying the invention; the described means however constituting but one of the various forms in which the invention may be employed.

Reference should be had to the accompanying drawing forming a part of this specification in which:

Fig. 1 is an axial transverse section through the wheel,

Fig. 2 is a side elevation of a part of the wheel, parts thereof being taken away.

Fig. 3 shows another type of means of connecting the pneumatic tire to the wheel body in axial sectional elevation, and Fig. 4 shows the same means of connection in cross-section.

Fig. 5 illustrates in sectional elevation a further modified construction of the means to attach the tire of fixation of the wheel body.

The wheel shown in Figs. 1 and 2 comprises a wheel body 1 with an integral hub adapted to receive the axle drive shaft. The wheel body 1 is provided with a rim 2 having T-slots 3 arranged at its periphery. The slots 3 are all of the same dimensions, they are arranged at regular distance apart and run in axial direction. On the rim 2 sections 4 of a ring are slidably mounted. Each section 4 is provided with a rib 5 projecting radially and having a T-shaped cross-section. The head of the rib 5 engages the groove 3 and secures the section 4 on the wheel body 1. The latter is provided with a flange to receive the one leg 11 of the pneumatic tire 10. The second leg 11 of said tire 10 is arranged between a flange 8 of the pressure ring 7 and the ring sections 4. The pressure ring 7 is displaceably arranged on the rim 2 of the wheel body 1 and may be axially displaced by the screws 9 arranged at regular distances apart. By tightening the screws 9 the ring 7 displaces by means of the flange 8 all the sections 4 in axial direction, the tire 10 is thereby firmly clamped between the flanges 6, 8 and is secured thereby against displacement on the wheel body 1. Fig. 1 shows the tire and the wheel body approximately in their true position. It will be seen that the breadth of the tire 10 measured in radial direction is great in comparison with the outside diameter of the wheel body 1. The strain exerted by the tire 10 on the wheel body is important but a slipping of the tire 10 on the wheel body is prevented by the firm grip of the members 4, 6, 7 on the tire 10. Any suitable means for instance the increase of the contacting faces of the members 4, 6, 7 with the tire may be used to increase the gripping power thereof. The contacting faces may be provided with serrations or any other means to increase friction. The distancing ring may have four sections 4 as shown, but more or less sections may be used, moreover an undivided distancing ring may be used.

In the modified construction shown in Figs. 3 and 4 the wheel body 1 is provided with ledges 12 protruding radially from the periphery of the body 1. The ledges 12 engage grooves 13 running in axial direction at the inner wall of the distancing ring 14. The latter may be displaced on the body 1 by means of a pressure ring 17 and is used to grip the inner edges 11 of the tire 10. The ring 17 is provided with recesses 16 into which sockets 15 of the body 1 project. The said sockets 15 prevent a slipping of the ring 17 on the body 1. The axial displacement of ring 17 and therewith of ring 14 is effected by screw bolts 9 engaging screw threaded holes in the sockets 15. The ring 14 may be undivided or made up of sections.

In Fig. 5 still further means are shown to prevent a creeping of the distancing ring 20. The ring 20 is provided with slots 24 running in axial direction. Through each slot 24 a screw bolt 21 passes which is inserted in a radial bore of the felly 22 of the wheel body 1. The said means allows an axial displacement of the ring 20 but they prevent a creeping thereof on the rim 22 of body 1.

What I wish to claim is:—

1. In a vehicle wheel of the type aforesaid, a wheel body adapted to receive the axle, a pneumatic tire adapted to be detachably mounted on said wheel body, a distancing ring axially movable on said wheel body and located between the base flanges of the tire, means to slidably interconnect the said distancing ring and the said wheel body, a pressure ring, screws engaging said pressure ring, said distancing ring being composed of a plurality of sections, each section having means engaging the wheel body.

2. In a motor vehicle wheel as defined in claim 1 a distancing ring composed of a plurality of sections, each section having means engaging the wheel body, said means comprising grooves in the rim of the wheel body, running in axial direction, and a rib on each section slidably engaging one of said grooves.

3. In a vehicle wheel, a wheel body adapted to receive the axle, a pneumatic tire detachably mounted on said wheel body, a distancing ring axially movable on said wheel body and composed of a series of segments each having T-heads, the wheel body having slots to receive said T-heads and thereby slidably connect said distancing ring and said wheel body together, a pressure ring, and screws for holding said pressure ring in place on said wheel body.

HANS HÜRLIMANN.